United States Patent [19]

Adamski et al.

[11] 4,039,091

[45] Aug. 2, 1977

[54] ELEVATOR TYPE BUS BOARDER

[75] Inventors: Donald F. Adamski, Danville; Sol L. Morrison, Sierra Madre, both of Calif.

[73] Assignee: MB Associates, San Ramon, Calif.

[21] Appl. No.: 670,161

[22] Filed: Mar. 25, 1976

[51] Int. Cl.[2] .......... B60P 1/48

[52] U.S. Cl. .......... 214/77 R; 182/115

[58] Field of Search .......... 214/77 R, 75 R, 75 T; 182/1, 115, 96

[56] References Cited

U.S. PATENT DOCUMENTS

| | | | |
|---|---|---|---|
| 2,220,155 | 11/1940 | Jachim | 182/1 |
| 2,978,062 | 4/1961 | Camillo et al. | 182/115 |
| 3,912,048 | 10/1975 | Manning | 214/75 R |
| 3,918,596 | 11/1975 | Ward | 214/75 R |

OTHER PUBLICATIONS

Transit Technology publication, Apr. 1, 1974.

*Primary Examiner*—Robert J. Spar
*Assistant Examiner*—Ross Weaver
*Attorney, Agent, or Firm*—Harness, Dickey & Pierce

[57] ABSTRACT

A bus boarder for a wheelchair and its occupant and for the ambulatory impeded, embodies an elevator platform which is mounted within the entrance area at the front of the bus. The floor and the steps at the entrance are removed and a U-shaped reinforcing frame forms a well for the elevator platform. The elevator platform and its operating mechanism are so constructed that the doors open against each side of the entrance opening as originally provided for the bus. The elevator platform is lowerable to the ground or curbstone with the steps folded into a ramp for the wheelchair which is moved thereon by its occupant or an attendant and onto the platform. A fare box is mounted on a pivoted arm which is rotatable horizontally into a well in the bus dashboard, so as not to impede either the vertical motion of the elevator platform, or the maneuvering of the wheelchair thereon. The wheelchair occupant enters the platform backwards if the chair is of extended size, or if of standard size either forward or backward. The wheelchair and occupant are raised to the floor area located above the bus wheels (the "transport area") and a transfer table is moved from beneath the transport area to the area between the elevator platform and the side wall of the bus above the step well. The wheelchair occupant can then drop a fare in the fare box, move forward onto the table and then to the transport area if the chair has entered backward. Once on the transport area, the wheelchair occupant can execute a 180° turn, set his brake, fasten his optional seat belt, and ride facing forwardly. If the chair has entered forward, the occupant backs onto the transport area and rides facing forward. In either case, before disembarking, the wheelchair if of extended size makes a 180° turn so as to back onto the platform, from which position the occupant can leave the bus facing the door. A rail mounted in cantilever on the outer forward corner of the platform permits the ambulatory handicapped and elderly to steady themselves when standing upon the platform and being raised therewith. The transport area is of sufficient length to accommodate two wheelchairs facing forwardly. A horizontal rail and two vertical spaced rails are provided on the aisle edge of the platform and at its back for use by nonhandicapped passengers, as well as to provide a protective constraint for the wheelchair occupants. A raised lip is further provided along the aisle edge of the transport area to prevent the wheelchair from rolling off while making the 180° turn.

15 Claims, 17 Drawing Figures

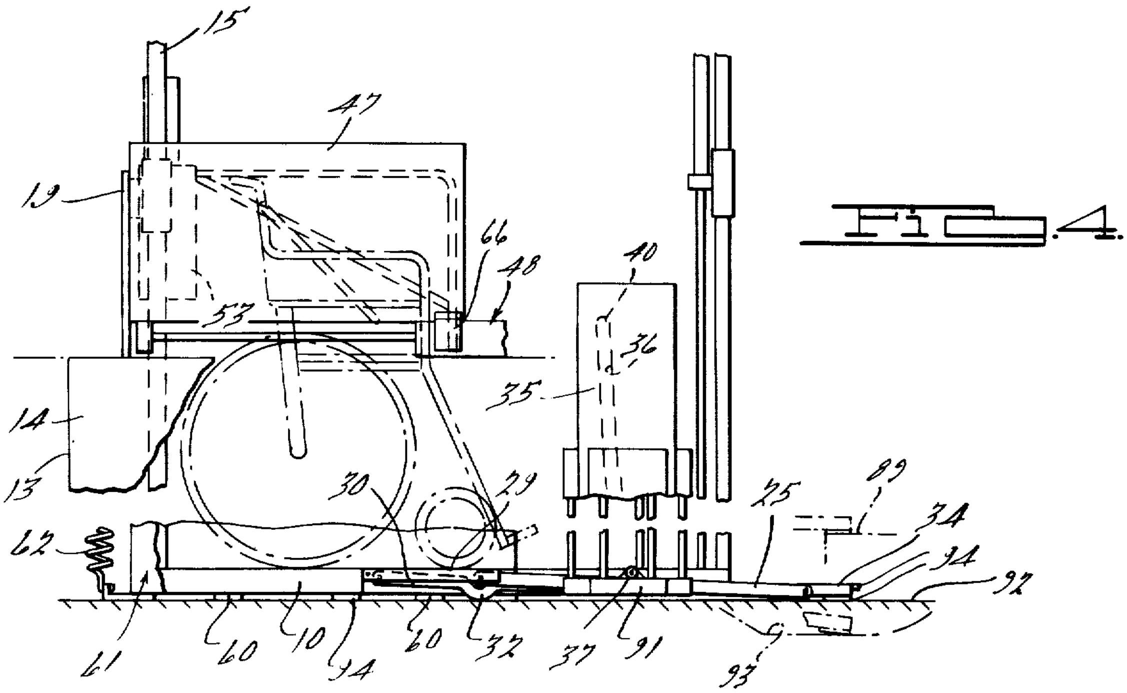
FIG. 4.
FIG. 7.
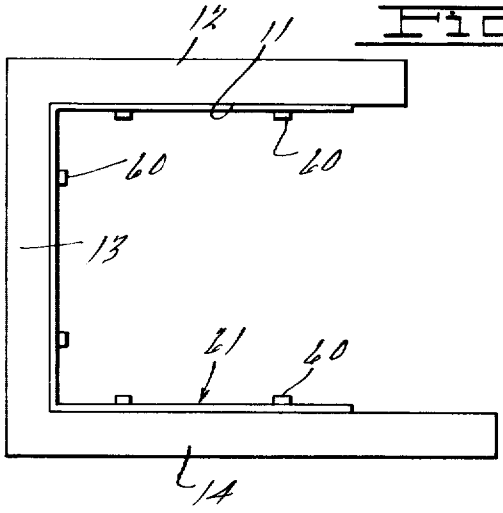
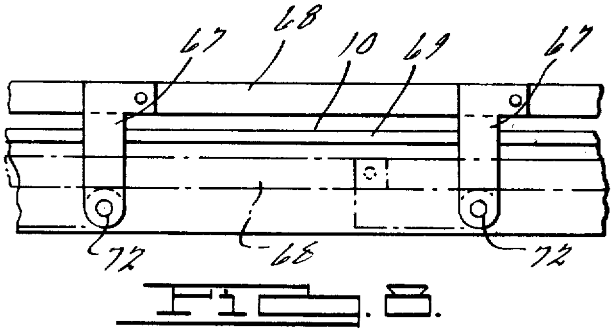
FIG. 8.
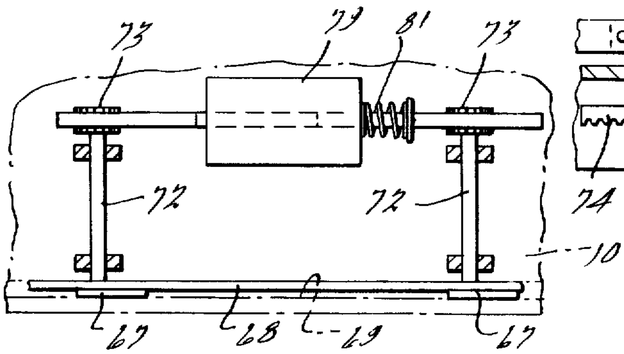
FIG. 9.
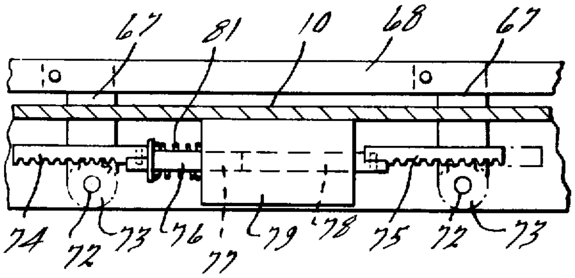
FIG. 10.

ELEVATOR TYPE BUS BOARDER

For safety, a pair of retractable lips is provided on the outside edge of the elevator platform. These are extended upward after the wheelchair occupant is positioned to be raised, so he will not roll off during ascent. The lips are retracted for the turn into the transport area, and also when the elevator is in stored position for use by the nonhandicapped via the steps. A telescoping skirt is provided around the elevator platform when it is lowered to the street so as to present three solid walls to the entrant, similar to an elevator in a building. This provides a positive stop for the wheelchair when boarding, positions it for safe ascent, prevents injury from shearing or pinching to all users of the bus boarder, whether ambulatory or in a wheelchair, and shields seated passengers within the bus from the outside environment during operation of the elevator.

The ramp in extended position can provide level access to the bus interior from a curbstone, even if the bus itself is inclined due to the street crown. The ramp can provide access from the street level at an inclination within accepted standards, or accommodate to slight depressive irregularities in street contour if required.

The elevator can also be lowered partway to the street without the steps deploying to a ramp. In this position, the platform is disposed approximately 8 inches from the street, with the remaining two steps of the device also of approximately eight inch rise. Thus, an elderly or handicapped person will be required only to climb steps which are not greater than approximately eight inches in height either from the ground or from the top step to the bus floor. The operating time for the apparatus to achieve this configuration is three to six seconds. This feature saves schedule time for the bus operator when no wheelchair user is to be served.

The entire operating cycle of the apparatus when a wheelchair user is boarded can range from 10 to 30 seconds. Tests indicate that the maneuvers to use the bus boarder can be executed by an occupant of an electric wheelchair in 5 to 12 seconds. No apparatus protrudes from the bus side during boarding and disembarking except for approximately 1 inch of the bottom step beyond the open doors when in "ramp" position. All operations of the elevator are performed within the closed interior of the bus. The above features make the bus boarding system disclosed herein suitable for regular line haul service in crowded urban areas, as well as suburban and rural line haul service for use by all members of the riding public, handicapped and nonhandicapped alike.

BACKGROUND OF THE INVENTION

Various types of platforms have been suggested heretofore in the art for use as a bus boarder. One known in the art has a platform mounted on parallelogram arms on opposite sides which are tilted by a sprocket and chain drive for raising the platform from the ground and depositing it on the floor within the bus. This type of mechanism required substantial changes at the bus entrances including remounting the doors to swing outwardly rather than retaining them in their original swing-in position.

RELATED APPLICATION

An application by Donald F. Adamski, et al, Ser. No. 599,063 for Bus Loader was filed on July 25, 1975 and assigned to the assignee of the present invention.

SUMMARY OF THE INVENTION

The invention pertains to an elevator in a bus well formed at the front entrance of the bus by removing the steps and the adjacent portion of the floor and providing a U-shaped reinforcing element at the floor level to form the well for the elevator platform. The platform has two hollow tubes fixed thereto at opposite corners at the bottom which are retained in sleeves fixed to the reinforcing elements in which they slide upwardly and downwardly to be guided thereby. Rams are supported on the reinforcing elements adjacent to said tubes with the piston rods connected to the platform for raising and lowering the platform to and from different positions. This is under the control of the bus driver, who presses a button for the movement of the platform to a desired preset position. The platform has a pair of spaced links pivoted to each forward side for supporting a pair of steps which are also pivoted to the links. A pivoted torsion bar connects the top links of each pair for retaining the links in the same position on each side of the platform.

A cam plate at one side of the steps has a cam slot in which a roller, pivoted to the top link adjacent thereto, projects. The roller is positioned by the slot as the platform moves up and down to change the position of the links and step plates. This actuates the opposite set of links through the torsion bar to retain the steps in the position desired for the location of the platform. Flexible closing webs, acting as risers, are connected between the platform and top step plate and between the top and bottom step plates which close the area between the plates and the platform against the passage of air. A plane surface is provided by the step plates and riser webs when flattened as the platform is lowered toward the ground to form a ramp for a wheelchair which moves thereacross to occupy a position on the platform. The forward end of the platform is provided with a narrow trough so that the wheelchair occupant will know when the driving wheel has passed thereover. A barrier may be mounted on the inner edge of the platform to limit the backward or forward movement of the wheelchair thereon. The platform is raised to have it located at the approximate level of and parallel to the floor area above the wheels (the "transport area") and a table is moved forwardly from beneath said floor area to span the space above the steps so that the occupant of the wheelchair may move forwardly or back thereonto and onto the transport area. If the wheelchair occupant has moved forwardly onto the transport area, he may turn 180° on the transport area so he may ride facing forwardly. A safety or modesty panel is moved transversely across the aisle to prevent anyone walking in the aisle from reaching the well area when the platform is lowered. The panel is shifted to initial position across the front of the wheelchair when the platform is lowered back to stored position of the bus floor level, ready to be used by nonhandicapped passengers in the conventional manner.

BRIEF DESCRIPTION OF THE DRAWINGS

FIG. 4 is a view of the platform in its lowermost position with the steps extending therefrom in "ramp" position and resting on the ground or a slight depression below the ground, or upon the curbstone to permit a wheelchair and its occupant to be rolled thereacross onto the platform;

FIG. 7 is a plan view of the U-shaped reinforcing members forming the well with a U-shaped safety element supported therewithin for movement upward and downward by the platform;

FIG. 8 is a view of the safety bar in raised position which prevents the advancement of the wheelchair toward the door if not properly retained;

FIG. 9 is a plan view of the structure illustrated in FIG. 8;

FIG. 10 is a sectional view of the structure illustrated in FIG. 9, taken on the line 10—10 thereof;

DESCRIPTION OF THE PREFERRED EMBODIMENT

Figure 1:
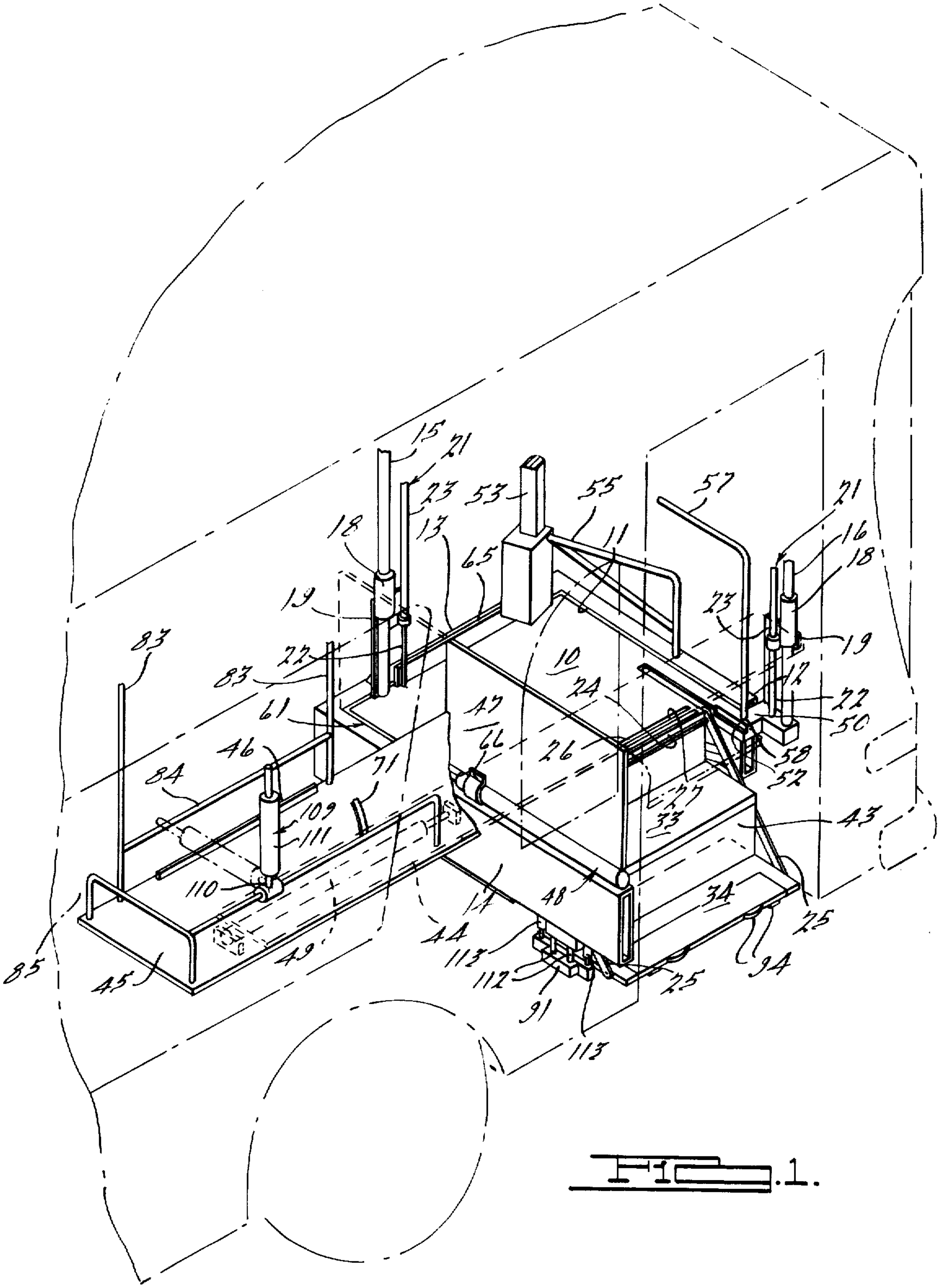
FIG. 1 is a perspective view of an elevator platform for a bus in stored position with the platform level with the bus floor and the steps in position for use by a nonhandicapped individual, all of which embodies features of the present invention.

An elevator platform 10 is supported in a well 11 defined by a forward transverse reinforcing element 12, a longitudinally disposed reinforcing element 13 and a rearward transverse reinforcing element 14 forming a U-shaped reinforcing member defining the well 11 in which the platform is movable upwardly and downwardly. The platform has two tubular elements 15 and 16 secured at the bottom thereto at diagonal corners and extending upwardly therefrom and through guide sleeves 18 which are attached to upstanding supporting elements 19 secured to the reinforcing elements 12 and 13. A pair of rams 21 have the piston rods 22 secured to the platform 10 adjacent to the tubular elements 15 and 16 with the cylinders 23 thereof secured to the frame elements 12 and 13 by the supporting elements 19. When fluid is delivered to opposite ends of the cylinders 23, the piston rods 22 will be retracted or extended to move the platform 10 upwardly or downwardly as the case may be.

Figure 5:
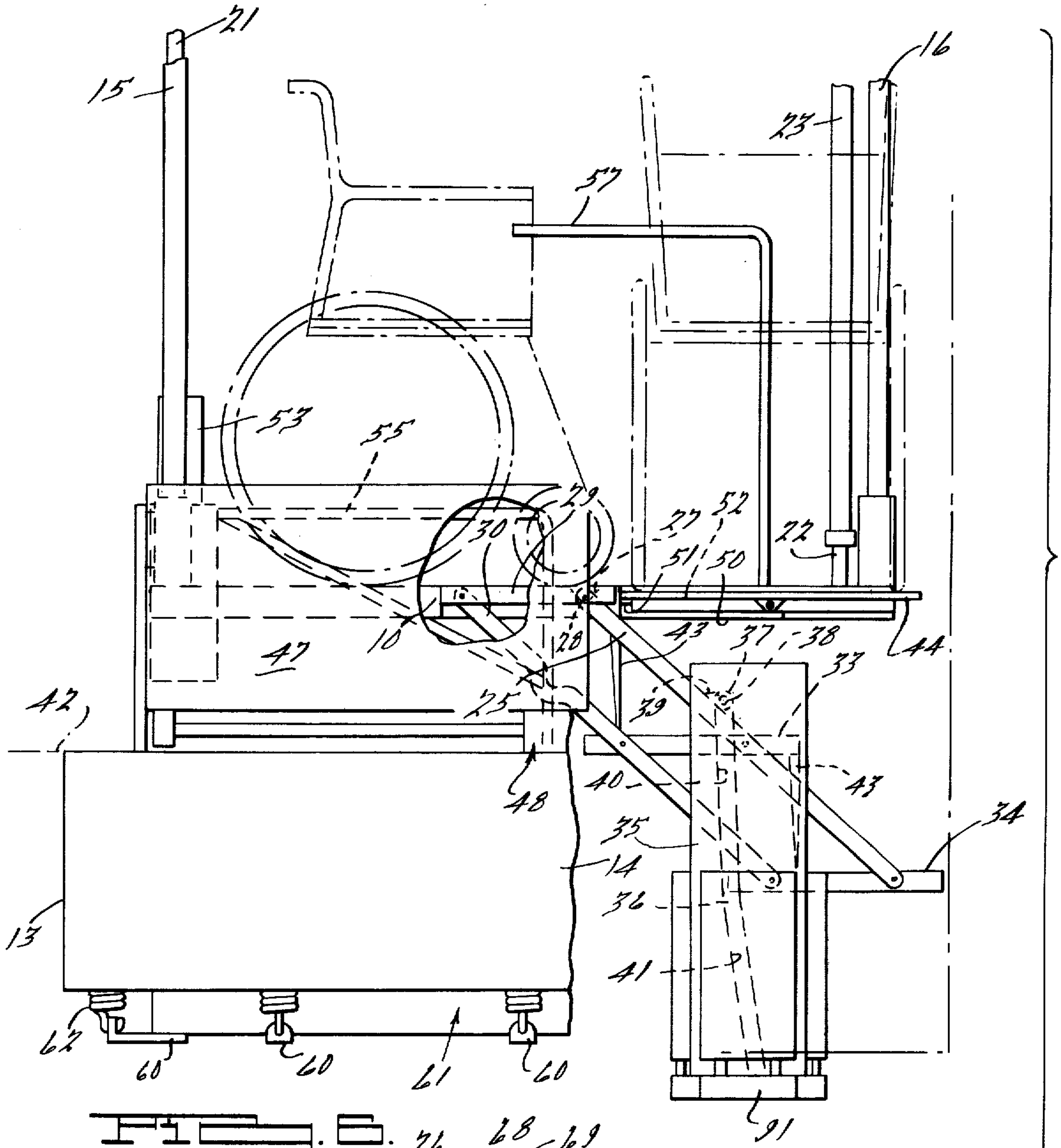
FIG. 5 is a view of the structure illustrated in FIG. 4 after the platform has been raised to the height of the floor area above the wheels and with a support table moved forwardly therefrom and disposed above the steps to permit the wheelchair to move thereon and onto the floor portion above the wheels.

The forward edge 24 of the platform has like spaced supporting links 25 fixed to the ends of a torsion bar 26 which is pivoted within a channel 27 at the forward edge of the platform by sleeve bearings 28 secured to the forward side edges of the platform. Like tiltable links 29 have their forward end pivoted on the ends of the torsion bar 26 which extends beyond the links 25. Like links 30 are secured by pivots 31 to the rear of the plates 29 between the plates and the edges of the platform. The links 30 are disposed parallel to the links 25 and in parallelogram relation with step plates 33 and 34, as illustrated in FIGS. 4 and 5. A cam plate 35 mounted on reinforcing element 14 at the rear side of the platform 10 has a cam slot 36 therein in which a roller 37 extends when mounted on a pivot 38 attached to a finger 39 on the top edge of the link 25 located adjacent to the cam plate 35. The roller is guided in the upper cam slot portion 40 which slopes rearwardly and in the lower cam slot portion 41 which slopes forwardly to position the links 25 and 30 in a desired "step" or "ramp" position, depending on whether they are to be used by an ambulatory person or by one in a wheelchair.

Figure 2:
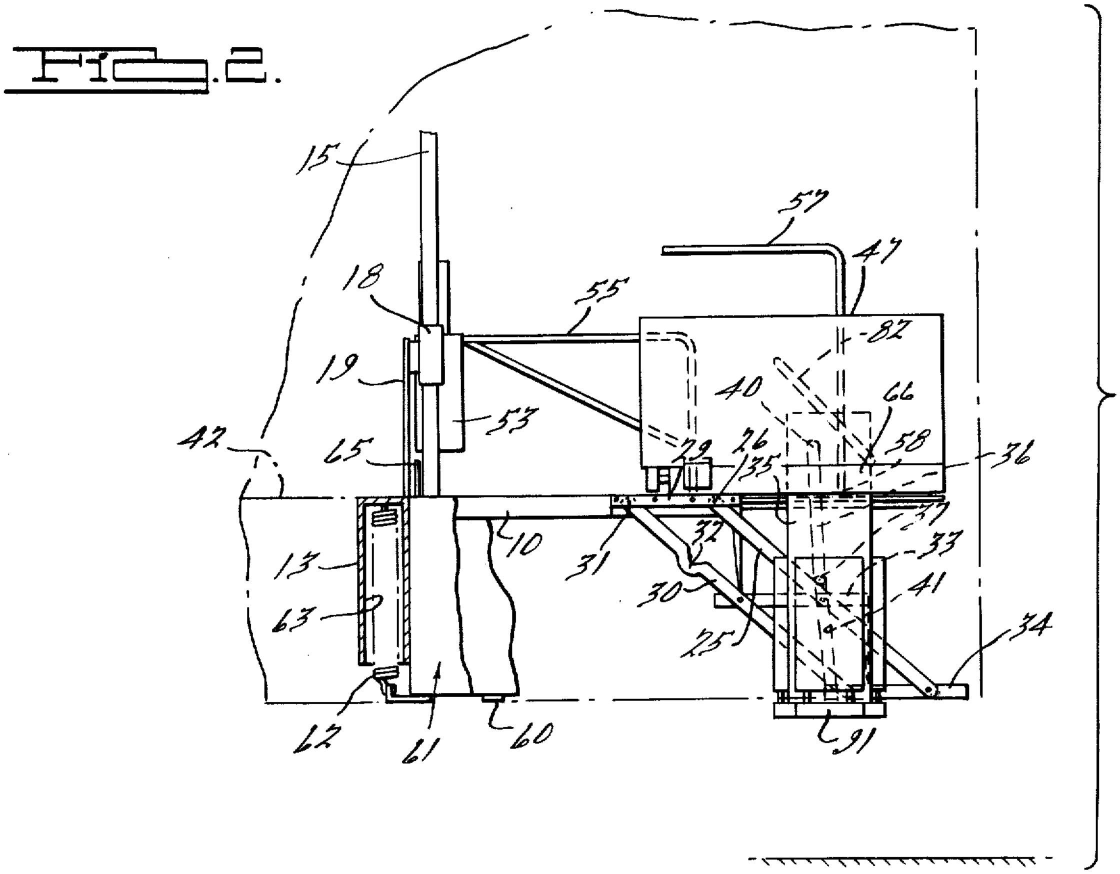
FIG. 2 is a side view of the structure illustrated in FIG. 1, with the platform at the height of the bus floor level.

The platform 10 may be lowered with the step plates 33 and 34 from the stored position illustrated in FIG. 2 where the step plate 34 is as much as 16 inches above the ground. When an elderly ambulatory person is to use the steps, the platform is moved down to the position shown in FIG. 3, where the step plate 34 is approximately eight inches above the ground. When boarding is to be accomplished and the step plate 34 is 16 inches from the ground, the elderly person finds it extremely difficult to step upon the bottom step plate 34. By lowering the platform, the elderly person can mount the step plate 34 when it is eight inches from the ground without difficulty. In this position, the platform is eight inches below the bus floor 42 and the maximum height of any of the steps is not more than approximately eight inches. It will be noted in the figures that a pair of flexible webs 43 are connected near the front edge of the platform and to the rear of the step plate 33 with one also connected near the forward edge of the step plate 33 and the rear of the step plate 34. The webs 43 seal off some of the well area to provide more comfort for the seated passengers. When the steps are in flat "ramp" position, the webs 43 are disposed under and between the platform 10 and the step plates 33 and 34 to provide flatness to the ramp.

When the platform is moved to its uppermost position, as illustrated in FIG. 5, a spanning table 44 is moved from beneath the floor or transport area 45 above the wheels to extend across the front of the well above the steps, as illustrated in FIGS. 1 and 5. In this position, the wheelchair may roll forward if an extended type, or forward or backward if standard, from the platform onto the table 44, and then onto the floor or transport area 45. Once on the transport area 45 the wheelchair occupant may execute a 180° turn to face the front of the bus, in case he has entered the transport area forwardly. A raised lip 46 is disposed along the aisle edge of the transport area 45 to prevent the wheelchair from rolling off the edge when maneuvering thereon. The occupant sets the brakes and fastens an optional seat belt 71 across the lap. Tests carried out in an actual bus at off-highway speeds up to 40 mph have shown that setting the wheelchair brakes, together with high friction flooring on the transport area, provide excellent stability. The belt which need not contact the occupant is to provide additional constraint in the event of sudden stops of the bus, limiting any motion of the wheelchair to a few inches before an appreciable velocity relative to the bus can be developed.

Such a belt 71 cannot serve a quadriplegic wheelchair user, however, who does not have full use of his arms. An alternative restraining bar 109, mounted on the inner rail 84, is stored in a vertical position and is rotated to a horizontal position by releasing the pivot 110. The bar carries a padding cylindrical section 111 and is controlled both by the bus driver and by push buttons mounted on the bus wall in the vicinity of the driver and the actuator 110. The guadriplegic passenger requests the bus driver to actuate the bar after the wheelchair is brought to proper position. A paraplegic passenger may operate the bar himself, however, after he has set his wheelchair brake.

Figure 3:
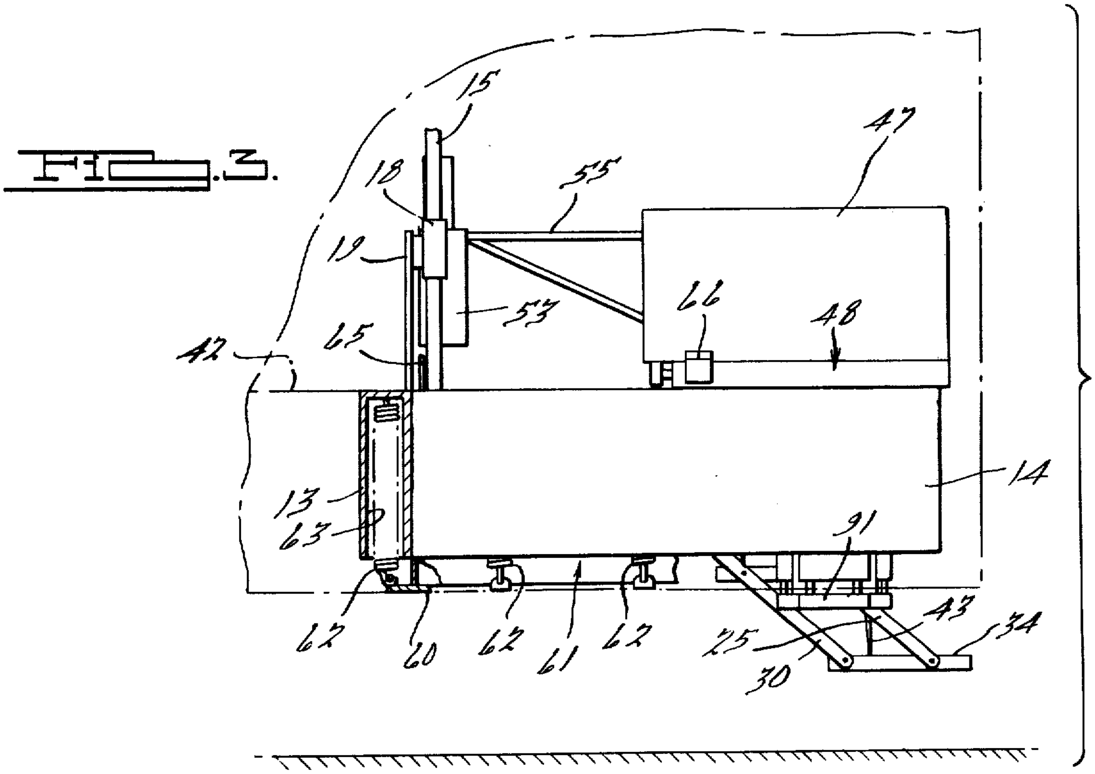
FIG. 3 is a view of the structure illustrated in FIG. 2, with the bottom step lowered to a position approximately eight inches from the ground and with the platform lowered the height of a step below the bus floor level.
Figure 11:
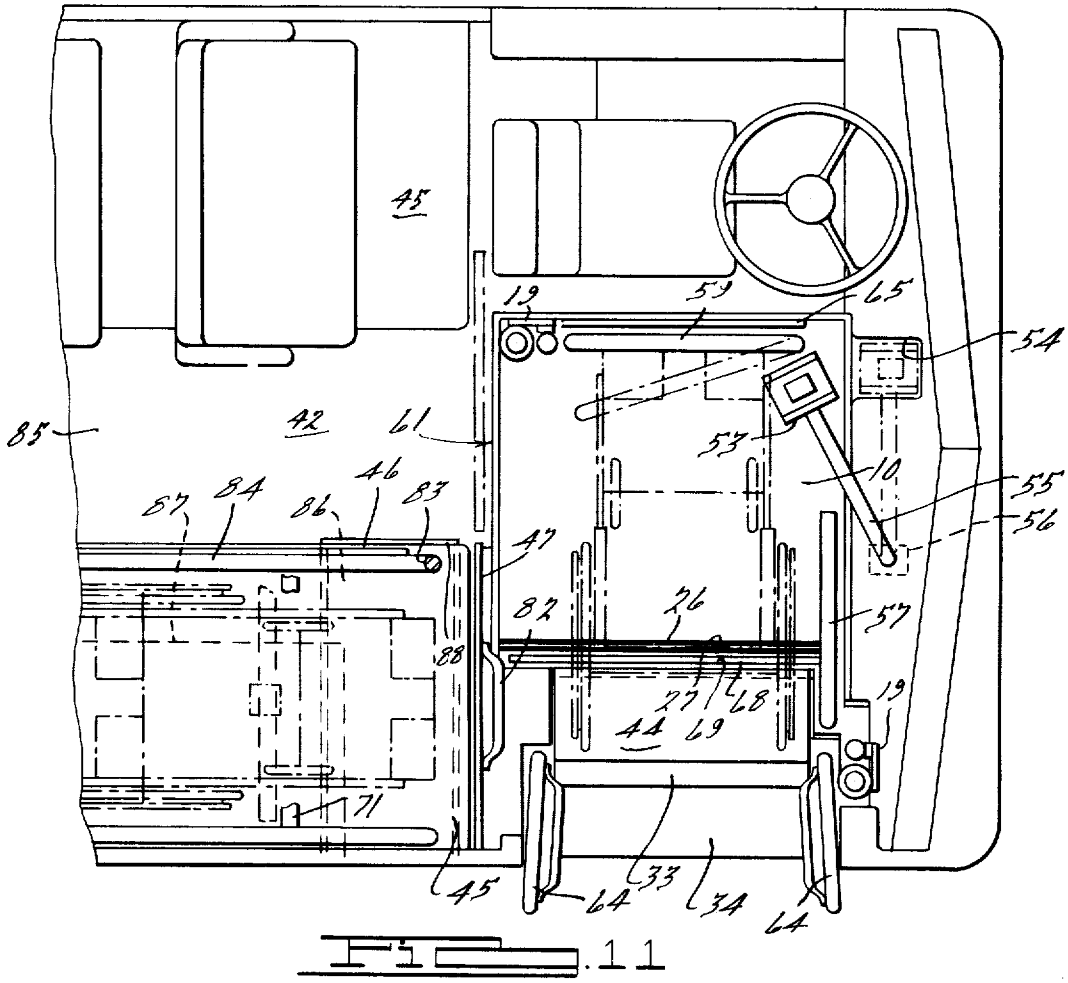
FIG. 11 is a broken plan view of the interior of a bus with a plurality of the wheelchairs on the floor area above the wheels.

A safety or modesty panel 47 is then moved from the aisle to the door area on the reinforcing element 14 by a ram 48 which is disposed therebelow to prevent any further forward movement of the wheelchair and to provide some privacy for the occupant, as illustrated in FIGS. 3 and 11. The panel 47 is moved from a safety position across the aisle where it was retained during the time the platform was at the bottom of the well 11 to receive the wheelchair so as to prevent a person from falling therein. The table 44 is advanced and retracted from and to a position under the floor area 45 by a ram 49 to be confined within framing members disposed thereabout. The table rests upon a flange 51 at the forward edge of the platform 10 with the forward end of the table supported in a slot 52 in the platform extension 50, as illustrated in FIG. 5.

As pointed out above, when the bus is not near a curb and the door is open for the admission of a nonhandicapped person who will have no difficulty to mount the steps to the platform, a handicapped or elderly person will find it difficult to step onto the lower step plate 34, which would be as much as 16 inches from the ground. A control for this platform movement is so arranged that a single lever operated by the bus driver will produce the desired platform movement to a position approximately 8 inches above the ground as pointed out above.

Figure 12:
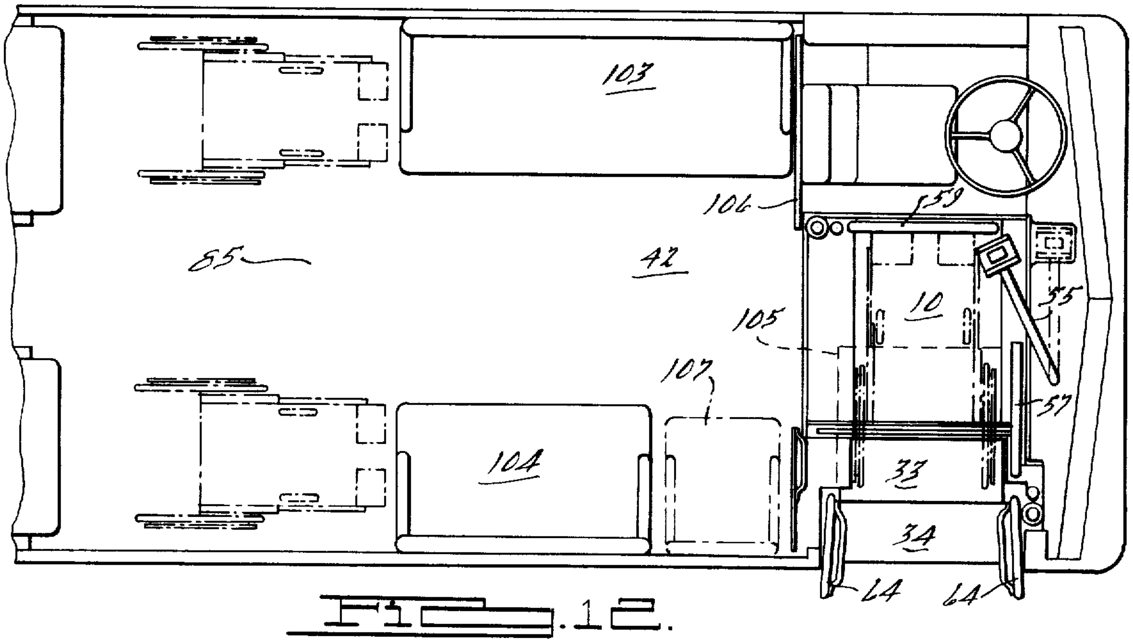
FIG. 12 is a broken plan view showing the interior of a bus with a plurality of the wheelchairs disposed on the bus floor in rear of the floor area above the wheels.

When the wheelchair occupant backs across the step plates when used as a ramp, illustrated in FIG. 4, he will reach the platform 10 where the fare box 53 has been rotated away from the vertical path of the upwardly moving elevator platform into a recess 54 in the dashboard of the bus. This is accomplished by the angular movement of the fare box supporting bar 55 which is supported on the reinforcing element 12 and operated by a hydraulic actuator 56. The fare box when moved into the recess 54 is completely out of the way of the wheelchair maneuvers. The chair occupant deposits his fare or gives his fare to the driver and then rolls forward upon the spanning table 44 and onto the transport area 45. A bracing element 57 is supported in cantilever on the platform 10 at the point 58 on the forward side thereof by which one entering the bus may be stabilized. A similar bracing element 59, as illustrated in FIGS. 11 and 12, is fixed to the platform on the driver's side which has a releasable bayonet locking joint (not shown) which when raised permits the element 59 to be moved out of bracing position to permit the bus driver to reach his seat.

A downward and upward movable U-shaped element 61 which surrounds the platform on three sides when lowered, is upwardly disposed within the reinforcing elements 12, 13 and 14, as illustrated in FIG. 7, so as to clear the road when the bus is in motion. The safety element 61 is moved down against upwardly acting springs 62 located in openings 63 formed in the hollow reinforcing elements 12, 13 and 14. This downward movement is produced by the platform which engages inwardly extending fingers 60 located along the bottom of the U-shaped element when the platform is lowered for boarding to prevent the advancement of the wheelchair therebeyond. The wheelchair is fully maneuverable upon the platform 10 since the fare box 53 is moved into the recess 54. The bracing element 57 is fixedly disposed on the platform adjacent to the tubular guide rod 16 and the forward ram 21 adjacent to the doors 64 so that nothing interferes with the forward view of the driver. An upstanding strip 65 at the inner edge of the platform 10 may also be used to prevent the wheelchair from running off the inner edge thereof when the platform is raised.

A pair of plates 66 are mounted on opposite sides of the ram 48 for positioning the safety modesty panel 47 when mounted along the top edge of the ram 48, as shown in FIG. 3. The torsion bar 26 is supported on each side of the platform 10 within sleeve bearings 28 secured to the platform edge in which the torsion bar 26 rotates when fixed to the upper links 25. The plates 29 are pivoted to the extending ends of the torsion bar. The lower links 30 are secured by pivots 31 to the plates 29 on the inside thereof to be between the platform sides and the plates. The plates 29 are tiltable when the links 25 and 30 are in "ramp" position as will be explained hereinafter.

An attendant may move the wheelchair onto the elevator platform in position to be raised to transfer height. The attendant will pull the longer wheelchair backwards into the bus and lock the wheelchair's brakes. A pair of arms 67 are raised to raise a cross bar 68 from a recess 69 between the torsion bar 26 and the front edge of the elevator platform 10 to prevent the wheelchair from rolling into the stairwell should the brakes thereof slip or release. A safety interlock function is provided in the operating sequence so that the platform cannot rise until the bar 68 is raised. At transfer height the bar 68 and arms 67 are retracted into the recess 69, the chair brakes are released and the chair is maneuvered to the transport area 45. If an attendant is present, he swings the chair about to face forward, locks the brakes and fastens a seat belt 71 or operates the padded restraining bar 109. He now walks forward on transport area 45 to the platform 10 which is lowered to aisle floor height 43, after which the modesty panel 47 is moved to the position in front of the wheelchair. The platform has now returned to stored position, as illustrated in FIG. 2, and the attendant selects a seat as a nonhandicapped passenger.

A downward and upward movable safety U-shaped element 61 surrounds the platform on three sides and is slightly spaced from the inner face of the reinforcing elements 12, 13 and 14. The height of the U-shaped element is greater than the distance from the bottom of the reinforcing element to the street so that it will always be maintained within the well area slightly spaced from the reinforcing elements. A pair of openings 63 extend inwardly from the inner faces of the hollow reinforcing elements 12, 13 and 14 in which coil springs 62 are supported from the top to have the bottom downwardly extending wire section provided with a hook which engages the U-shaped element at two points on each of the three sides for moving the U-shaped element upwardly when the platform moves upwardly. Each side of the bottom edge of the U-shaped element is provided with two inwardly extending fingers 60 which are engaged by the bottom edge of the platform 10 when lowered therebeyond. It will be seen that there will be no area between the edge of the platform and a wall of the well which could pinch or severely damage a person on the platform due to the upward movement thereof. The U-shaped element 61 also provides some protection against the cold when lowered to the ground to permit the entrance or exit of a wheelchair. When in raised position, the U-shaped element 61 is within the area above the bottom of the bus body so that it will not be damaged when the bus is moving.

Referring to FIGS. 8, 9 and 10, a safety device is recessed in the platform 10 in a slot 69 located ahead of the slot 27 and torsion bar 26. A pair of spaced arms 67 are secured within the slot 69 to shafts 72 which are journaled within the platform 10. The opposite end of the arms is secured by pivots to a crossbar 68 which moves upwardly to a position illustrated in FIG. 8 from the slot 69 when the arms 67 are moved from horizontal to vertical position by the rotation of the shafts 72. The shafts 72 are provided with pinion gears 73 which are operated by rack sections 74 and 75 which are joined to an offset member 76 with the one portion 77 made of iron while the other portion 78 is made of nonmagnetic material such as aluminum, copper, brass and the like. A magnetic coil 79 having a diameter equal to the height of the platform has the joined portions 77 and 78 disposed in the center thereof so that when the coil is energized the section 77 of iron will move to the right to rotate the pinion gears 73 through 90° to move the arms 67 to vertical position. The crossbar 68 moves upwardly from the slot 69 and prevents the wheelchair from moving toward the door and prevents it from falling into the well should the brakes slip or become accidentally released. When the platform 10 has been lowered to the ground to receive the wheelchair, the movement of the control lever by the bus driver to raise the platform will cause a relay to be energized and close a circuit to the coil 79 and thereby raise the crossbar 68 to provide protection until the table 44 is advanced to extend over the well area. When the forward end of the table 44 extends into the slot 52 in the extending portion 50 of the platform, it will open a switch to deenergize the relay (not shown). The switch is closed when the relay opens as the table 44 is retracted to its initial position with the circuit in position to be closed by the first said switch. A spring 81 between the coil 79 and rack section 74 will return the crossbar 68 and arms 67 into the slot 69 to permit the wheelchair to be maneuvered on the platform 10 and table 44. It is to be understood that in place of the coil 79 an electrically operated mechanical actuator of other types may be employed under the control of the bus driver in the same interlock manner as mentioned above.

A handrail 82 may be mounted on the forward side of the modesty panel 47 to air an ambulatory person to ascent the step plates 33 and 34 to the platform 10 and floor area 42 of the bus. Two vertical rails 83 extend from the floor area 42 to the bus ceiling and form a part of the platform rail system together with the horizontal rail 84. These rails assist ambulatory passengers as they move along the aisle 85 by providing handholds therealong. A storage place 86 may be provided under the floor area 45 adjacent to the wheel housing 87 in which bus communication and safety equipment, such as radios, road flares, signals and fire extinguishers may be stored, as well as papers and other records for the bus driver. This compartment may be secured by a door 88 under the control of the driver.

The cam plate 35 has the upper portion 40 of the slot 36 disposed at an inward angle to cause the lower step plate 34 to move inwardly an amount to clear the closed doors, as illustrated in FIG. 5. The lower portion 41 of the cam slot 36 angles toward the entrance side of the bus for moving the steps to "ramp" position. The roller 37 rides in the upper portion 40 of the slot 36 during the normal ascent and descent of the platform when the step plate 34 is at least 8 inches above the ground. Before the step plate 34 moves further downwardly toward the ground, as illustrated in FIG. 5, the roller will travel in the lower portion 41 of the slot 36 and cause the links 25 and 30 to move to "ramp" position.

It will be noted in FIG. 5, when the platform 10 is in raised position in line with the transport area 45 that the roller 37 is in the top of the upper portion 40 of the cam slot 36. When the platform is lowered a short distance, the roller 37 in the upper portion 41 of the slot will maintain the step plates 33 and 34 in "step" position. In FIG. 2, the roller 37 is shown entering the lower sloping portion 41 of the slot 36 which causes the links 25 and 30 to begin to assume a horizontal position until when reaching the bottom of the slot, the links will be approaching horizontal or "ramp" position, as illustrated in FIG. 4. The step plate 34 may strike the curbstone 89, as illustrated in FIG. 4, when the roller 37 moves down with a crossbar 91 while the platform 10 is retained above the ground. The crossbar 91 is guided by rods 112 and is supported by rams 113 which moves the crossbar 91 upwardly or downwardly in synchronism with the links 25 and 30 when in ramp position. If the platform 10 strikes the street after the roller 37 leaves the slot 36 and is supported by a crossbar 91, links 25 and 30 in "ramp" position, as well as the platform 10 will engage either the street 92 or a slight irregular recess 93 therein, as illustrated in FIG. 4.

Figure 6:
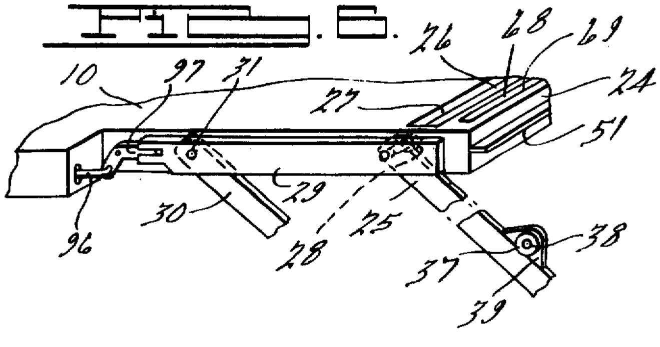
FIG. 6 is an enlarged broken view of the torsion bar located in a slot in the forward edge of the platform when supported in a bearing plate in which it is rotated when secured to the top links of the steps with a raisable safety bar disposed forwardly thereof.
Figures 13, 14, 15, 16, 17:
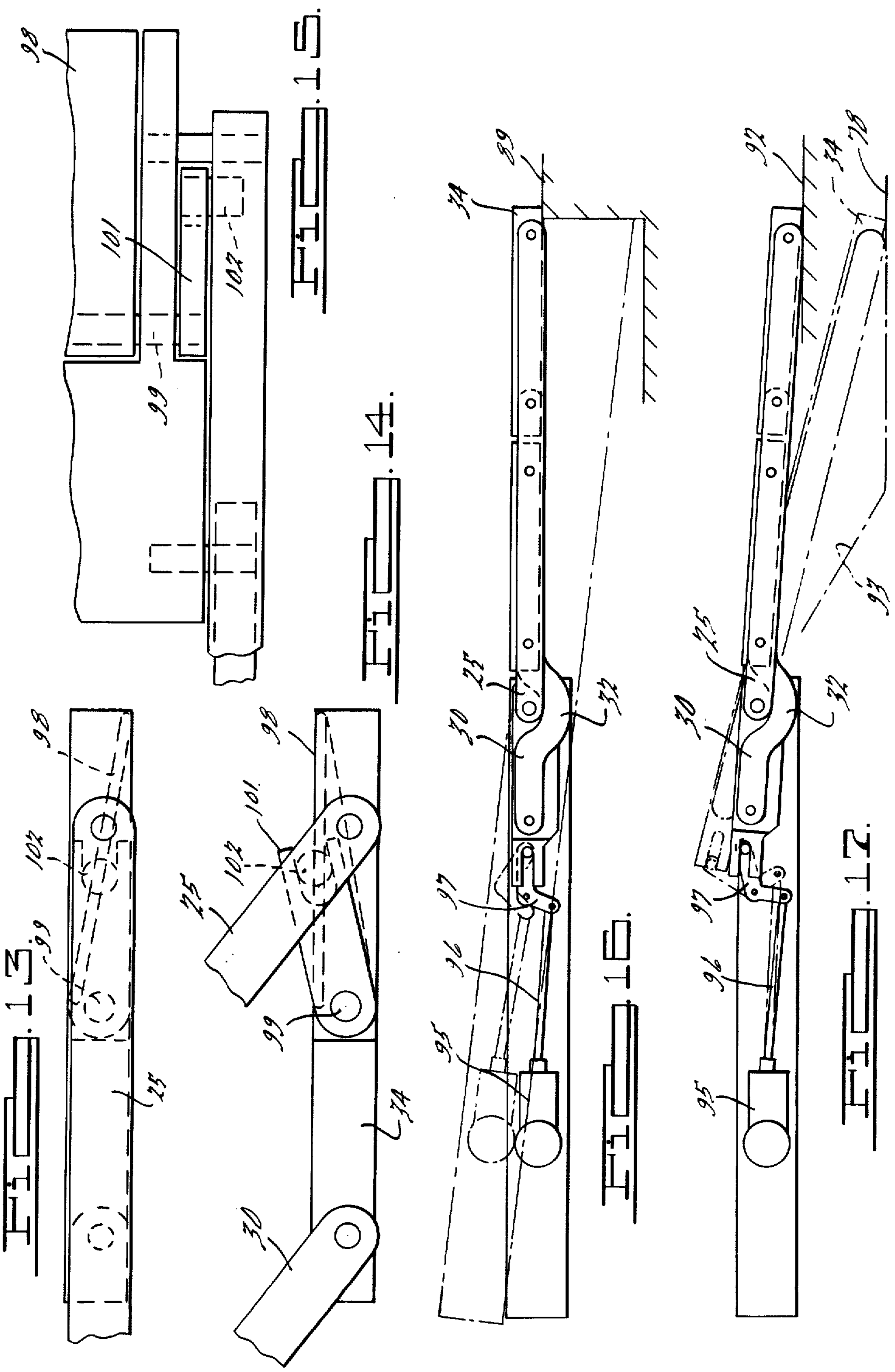
FIG. 13 is a broken side view of the steps showing the top panel of the bottom step plate in angular position with the step plates are in ramp position.
FIG. 14 is a view of the structure illustrated in FIG. 13, showing the top panel of the bottom step plate in step position.
FIG. 15 is a broken plan view of the structure illustrated in FIG. 13.
FIG. 16 is a side view of the platform with the step supporting links in "ramp" position and the bottom step plate resting upon a curbstone when the street is flat and shown in dot and dash line position when the street is crowned.
FIG. 17 is a view of the structure illustrated in FIG. 16, showing the step plates in ramp position when in engagement with the ground, or as shown in dot and dash line position when in engagement with the bottom of a depression adjacent thereto.

A material 94 which is sensitive to current flow, may be placed on the bottom of the step plate 34 and the platform 10 which will strike the street surface as the platform and links in "ramp" position are lowered, to complete a circuit which will produce the interruption of the downward operation. If the step plate 34 does not rest on the street surface, the plates 29, illustrated in FIGS. 6, 16 and 17, are operated by mechanical actuators 95. Rods 96 of the actuators operate bell cranks 97 to tilt the plates 29 and thereby shift the aligned links 25 and 30 to angular positions, as illustrated in FIGS. 16 and 17, in which the step plate 34 engages the street 92, or the bottom of a slight recess 93 to provide a stable engagement therewith to permit the wheelchair to ride thereover when the step plates are in a common plane, as illustrated in FIG. 4. The platform and ramp are illustrated in dot and dash line in FIG. 16 when the street is crowned and the bus is tilted toward the curb. The platform 10 will automatically continue downward and combined with angular movement of the plates 29 driven by actuators 95 upon the retraction of the piston rod 96, the boarding ramp formed by links 25 and 30 when in ramp position will be level, despite the tilted angle of the platform, as shown in FIG. 16. The wheelchair is rolled onto the platform 10 which is thereafter raised. During the raising operation the roller 37 enters the cam slot 36 and as it moves up the sloping lower slot portion 41 the links 25 and 30 are swung downwardly into "step" position by the time the roller enters the upper portion 40 of the slot 36, as illustrated in FIG. 5.

Referring to FIGS. 13, 14 and 15, a further arrangement of the links 25 and 30 when in "ramp" position is illustrated by the use of a pivoted panel 98 located in the top recessed area of the step plate 34. The panel 98 is secured to a pivot 99 which has a bifurcated arm 101 secured thereto which is operated by a pin 102 extending from the link 25. When the link 25 is moved toward "ramp" position, the rotation of the pin 102 swings the arms 101 downwardly rotating the pivot 99 and the panel 98 into angular position, as illustrated in FIG. 13, so that the occupant of the wheelchair need not pull himself upwardly over the front edge of the step plate 34. The angularly disposed panel 98 will have its forward edge located directly adjacent to the surface of the curbstone, street or depression so that the wheelchair may roll directly thereonto and upwardly across the ramp without undue effort. When the links 25 and 30 are in "step" position, as illustrated in FIG. 14, the panel 98 becomes level, for use by nonhandicapped passengers when entering or leaving the bus.

The sensitive material 94 may be employed on the front edge of the step plate 34 so as to stop the operation of the platform 10 in case something is truck by the step plate as it is moved forwardly. The sensitive material 94 is used on the bottom of the platform 10 and step plate 34 and may be applied to any other movable element which may be located in position to contact an object or a person so as to prevent damage to the mechanism or harm to the person if the operation is not stopped. Such stopping will occur when the sensitive material is applied to the striking element through an electric circuit completed thereby.

In FIG. 11, the interior of the bus is illustrated as having the floor area 45 extended to permit two or more wheelchairs to be moved thereonto in a manner mentioned hereinabove so that after the first wheelchair is moved onto the area, a second wheelchair at the same, or at another stop, may be raised and moved onto the front portion of the floor area. In this arrangement, both the first and second wheelchairs will be lowered to the ground if the first wheelchair to enter is to leave at a stop ahead of the second wheelchair which is returned to the floor area. Both of the wheelchairs may have a seat belt 71 on the padded restraining rod 109 available to secure the occupant and wheelchairs in position upon the floor area 45 in addition to the wheelchair brakes acting on high friction floor material.

As illustrated in FIG. 12, the floor area 42 on opposite sides of the aisle 85 at the entrance end of the bus has elongated seats 103 and 104 facing each other. Two of the forwardly facing seats (not shown) have been removed so that a wheelchair may be maneuvered from the aisle to the space inwardly of the seats 103 and 104. In this arrangement, the occupant of the wheelchair or the attendant will swing the wheelchair to the left or right after the platform 10 has reached the level of the bus floor 42 and will be advanced down the aisle to the area where it is to be stored and will be swung around when moved from the aisle 85 to face forwardly, the same as the forward facing seats. Either wheelchair may exit the bus without disturbing the other.

Referring again to FIG. 12, the platform 10 has a spanning table 105 carried therebelow for advancing from the front end thereof so as to permit the occupant of the chair or the attendant to roll the chair thereon and onto the floor area 42 adjacent thereto. The table 105 functions in the same manner as the table 44 hereinbefore referred to. The seat 104 may be made shorter than the seat 103, and a modesty panel 106 is movable by a ram (not shown) from across the aisle 85 to a position behind the driver so that the wheelchair can be swung into the aisle 85. When no wheelchair is present to maneuver from the platform, a folded seat 107 may be lowered for use by an ambulatory passenger. Other folded seats may be provided in the wheelchair transport area for use by ambulatory passengers when a wheelchair is not present therein.

Attention is called to the fact that the platform 10 is restricted to a vertical motion and there is no component of horizontal movement provided thereto which gives a feeling of security to the people being raised thereby. This arrangement permits the exterior appearance of the bus to remain unchanged with the doors 64 folding to a position on opposite sides of the door opening. The platform 10 in stored position is even with the bus floor 42 and can be used in the ordinary manner with the step plates 33 and 34 in "step" position so that the bus can be operated as a standard unit. The arrangement has the advantage of having the platform and steps moved to a position in which an ambulatory person can enter the bus in a very short time and be stabilized by handholds provided within the well area. The entering or leaving by a wheelchair similarly can occur in a very short time, the lowering of the platform and the movement of the links 25 and 30 and the step plates 33 and 34 to "ramp" position occur simultaneously and only require a few seconds. A few more seconds is needed to permit the ramp to be moved into engagement with the curbstone, street surface or depression therebelow so that the occupant of the wheelchair or the attendant can advance the wheelchair to the platform which is raised to the level of the transport area 45. The total cycle time of the mechanism, excluding passenger movement can range from 10 to 30 seconds, depending on the comfort maintained for the boarder.

Rails are provided about the transport area 45, useful for ambulatory persons as they walk down the aisle 85 especially during the time the bus is moving. When the bus is to be used for an ambulatory person or for one in a wheelchair, the bus driver has the operating lever set to operate in accordance with the required movements. The valves, actuators and the like are interlocked to operate in a sequence so that the driver need only to move a switch or valve lever to have the platform descend and the ramp extended to permit a wheelchair to advance thereover and after this is done to reverse the lever movement to return the ramp to step position and the platform to the transport area 45. This can be accomplished by the driver through the manipulation of a single lever or push button. This is also true of the movement of the platform and the step plates 33 and 34 for an ambulatory person by operating a different lever to lower the platform and steps to a desired position and after boarding to return the steps and platform to their initial positions. The platform may be employed for supporting a plurality of ambulatory people who, after reaching the platform, may be raised to the aisle level therewith.

It is to be understood that locking means may be provided to prevent any of the actuating levers to be operated, leaving everything under the control of the bus driver to provide a safety feature which prevents others from operating the platform. Additional interlocking means may be provided so that the platform cannot be moved from stored position while the bus is in motion or the bus cannot be moved while the platform is in other than stored position.

In the bus boarding system disclosed herein the bus driver has direct view of the deployment and retraction of the platform, the ground where the elderly or handicapped person is waiting to board or where the person will disembark, and the wheelchair when in the raising, lowering or transfer locations in the bus, as well as fare collection, without leaving the driver's seat and without using mirrors or other remote observation means.

The boarding system can be installed on and removed from the bus without modification to the main structure of the bus which involves its suspension and mechanical operating means. When installed and not in operation the elevator platform does not interfere with the conventional use of the bus since the step configuration does not differ from that provided on the unmodified bus. The system operates independently of the front doors and does not operate every time the front doors are opened. It is possible for the bus driver to operate the system manually in the event of an emergency or loss of power or when the control system fails, by turning a valve which shuts off the rams from the main hydraulic supply and connects them to a manually operated pump. In such an event, the platform will not move but will remain at the level it was stopped until the manual pump is activated. While the bus is illustrated with the driver on the lefthand side and the door on the righthand side, it is to be understood that the system can be applied to a bus having the driver on the righthand side and the door in any other position in the wall of the bus.

What is claimed is:

1. An elevator platform for a bus, including a reinforced frame providing an outwardly presenting U-shaped well at the bus entrance, a platform for raising and lowering movement within said well, guide means between said platform and frame, rams connected between said frame and platform for moving the platform upwardly and downwardly while guided by said guide means, a pair of spaced links pivoted at each side near the front of the platform, step plates pivoted between said links to form steps to the platform at said entrance, a torsion bar pivoted to the front portion of said platform and secured to the ends of the top links of the pairs, and cam means positioning said links when the platform is moved to different positions.

2. An elevator platform for a bus as recited in claim 1, wherein a roller is secured by a pivot to one of said top links, and a cam plate having a cam slot in which said roller moves as the platform is raised and lowered.

3. An elevator platform for a bus as recited in claim 1, wherein risers are pivotally supported at the front end of the platform and to the step plates therebelow which closes the areas between the platform and the step plates and pivots therewith into "ramp" position.

4. An elevator platform for a bus as recited in claim 2, wherein a cross bar is provided at the bottom of said cam plate, ram means supporting said cross bar, guide means for said cross bar, said roller engaging said cross bar when leaving the cam slot for retaining the step plates and links in flattened "ramp" position as the platform lowers.

5. An elevator platform for a bus as recited in claim 1, wherein table means is movable over the area above the steps to permit the wheelchair to back thereover into the storage area after being raised with the platform.

6. An elevator platform for a bus as recited in claim 5, wherein said table is carried below the floor area above the wheels, means for moving said table to bridge the gap above the step plates after the platform has raised the wheelchair and occupant to the plane of said floor area to permit the wheelchair to be rolled onto the table and thereafter onto said floor area.

7. An elevator platform for a bus as recited in claim 5, wherein said table is carried beneath the platform, and means to advance the table forwardly to cover the area above the steps to permit the wheelchair to be rolled thereonto.

8. An elevator platform for a bus as recited in claim 5, wherein ram means is provided for moving said table to advanced and retracted positions.

9. An elevator platform for a bus as recited in claim 1, wherein a safety panel is slidable transversely from a position across the floor aisle to a position across said floor area above the wheel in rear of the steps, and means for shifting the safety panel from one position to the other.

10. An elevator platform for a bus as recited in claim 1, wherein plates are pivoted at the forward end to the platform for pivotally supporting the pair of spaced links, and ram means for tilting said plates for moving the bottom step plate into engagement with the bottom of a recess in the street.

11. An elevator platform for a bus as recited in claim 1, wherein a recess is provided in the platform inwardly from the front edge in which the torsion bar is pivotedly supported, said recess indicating to the occupant that the wheelchair is completely on the platform.

12. An elevator platform for a bus as recited in claim 5, wherein the platform area above the wheel is elongated to permit a plurality of wheelchairs to be stored thereon.

13. An elevator platform for a bus as recited in claim 5, wherein forwardly facing passenger seats in the rear of the floor area above the wheels are removed to provide storage area for the wheelchairs at aisle level.

14. An elevator platform for a bus having elements forming a U-shaped well at the door opening permitting the doors to open in the usual manner, a platform in said well, ram means secured to the platform and elements extending thereabove, steps supported at the front of the platform, means moving said steps to substantially horizontal position to form a ramp to said platform when lowered, said steps in ramp position being attached to both sides of the platform on pivoted plates, and ram means for tilting said steps when in ramp position relative to said platform to have the ramp end accessible to a wheelchair.

15. An elevator platform for a bus as recited in claim 1, wherein control means is provided for positioning the links during the further downward movement of the platform to have them extend substantially in horizontal position forwardly of the platform to permit the step plates to be used as a ramp, a plate pivoted near to the rear edge of the bottom step plate, means for retaining said pivoted plate horizontally when disposed in the step position, and means for lowering the front edge of the pivoted plate to have it slope to the ground when disposed in "ramp" position.

* * * * *